United States Patent Office 3,470,766
Patented Oct. 7, 1969

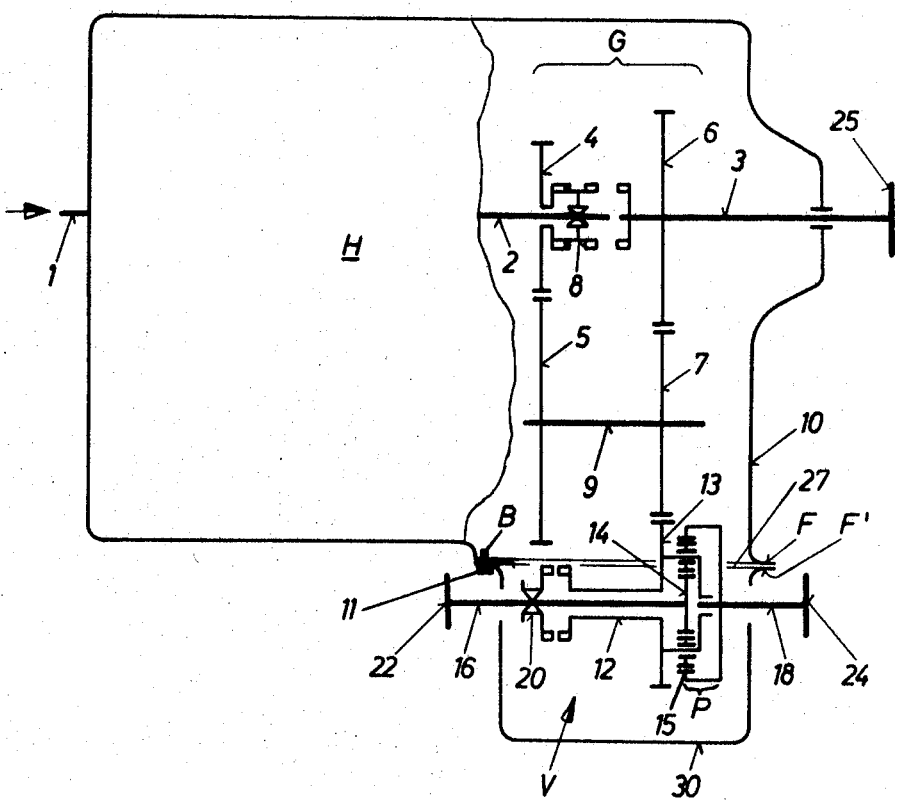

3,470,766
DRIVE FOR MOTOR VEHICLES
Alfred Magg and Friedrich Schreiner, Friedrichshafen, Germany, assignors to Zahnradfabrik Friedrichshafen, Aktiengesellschaft, Friedrichshafen, Germany, a corporation of Germany
Filed Oct. 27, 1967, Ser. No. 678,747
Claims priority, application Germany, Nov. 5, 1966, Z 12,514
Int. Cl. F16h 37/06, 57/02
U.S. Cl. 74—665               10 Claims

ABSTRACT OF THE DISCLOSURE

This invention relates primarily to four-wheel drive vehicles having a multispeed gear shift and distributor gear which divides the power flow equally to the front and rear axles. A particular feature of the invention resides in a housing arrangement for the multispeed gear mechanism and the distributor gear mechanism, each having a respective housing and the housings having complementary openings so that the distributor gear housing can be secured to the multispeed gear shift housing with the openings in register. Thus, the multispeed gear shift mechanism can be used for a two axle drive, i.e., a four-wheel drive vehicle, or the distributor gear housing can be removed, and the opening in the housing for the gear shift mechanism covered with a plate. The multispeed gear shift mechanism can then be used for a single axle drive vehicle.

There have been prior art arrangements of multispeed gear shift mechanisms and distributor gear mechanisms, but in all such prior art mechanisms the assembly is such that there is no optional use of the multispeed gear shift for either a multi-axle drive or a single axle drive. Further, prior art arrangements do not afford the advantages of compactness achieved in the present invention.

Briefly, the invention comprises a multispeed gear shift mechanism in a housing having a bottom opening and a distributor gear mechanism in a housing having a top opening, such openings being complementary and registrable so that the housings can be assembled by suitable flanges, thereby achieving in effect a single housing. Power flow from the gear shift mechanism is effected by meshing a gear of the last group thereof with a connecting gear which drives the distributor gear mechanism. Thus, the connecting gear is of sufficient diameter to protrude into the gear shift mechanism housing when the two housings are coupled to each other, to mesh with a gear on a countershaft of the final speed change gear group.

A detailed description of the invention now follows in conjunction with the appended drawing which is a primarily schematic diagram of the gear mechanisms and the respective housings in longitudinal section, but indicating the flanged construction of the housings.

Referring to the drawing, the input shaft 1 from the engine (not shown) brings power into a multispeed gear mechanism H having a housing 10 and an intermediate shaft 2 which will be understood to be driven through one or more gear groups (not shown) so as to bring power flow to the final gear group G.

Power flow from the gear group G is transmitted to the distributor gear V to drive the transmission shafts 16 and 18, all in a manner to be explained, having the coupling flanges 22 and 24, respectively, for front and rear drive connection to the vehicle axles (not shown).

The gear group G is comprised of the gear pairs 4, 5 and 6, 7 wherein gears 5 and 7 are keyed to the countershaft 9. Gear 4 is freely rotative on shaft 2 and can be coupled thereto (as shown) by means of the dog clutch coupling 8 for selective speed change in a well known manner. A driven shaft 3 carries the gear 6 keyed thereto and power flow can thus go from shaft 2 through the two gear pairs to shaft 3 when clutch 8 is coupled to the left in order to drive a transmission shaft coupling 25 when it is desired to use mechanism H with single axle drive.

Direct drive from shaft 2 to shaft 3 is effected by moving clutch coupling 8 to the right.

In such case, the bottom opening 11 of housing 10 will be understood to be closed with any suitable cover (not shown).

When the gear H is to be used for multi-axle drive, the distributor gear V carried in the housing 30 is then assembled to the housing 10 by means of the flanges F and F', any securing means such as bolts B, or the like, being utilized. Thus, the opening 11 at the bottom of housing 10 is generally complementary to and in register with the opening 27 shown at the top of housing 30 to serve the assembly purpose.

The distributor gear mechanism comprises a planetary differential gear device P and has a gear 13 of sufficient diameter to protrude into the housing 10 so as to mesh with the gear 7 therein. The carrier for the planetary gear device is coupled to gear 13, which gear also has a tubular shaft 12 concentric with shaft 16 and connected to the lock-up clutch 20 likewise on shaft 16. When the lock-up clutch 20 is engaged, the sun gear 14 is locked to the carrier so that the planetary device rotates as a block, and shafts 16 and 18 for fore and aft transmission are positively coupled. Otherwise, the differential device is free to function as such in order to distribute power via the sun gear and shaft 16 forwardly and via the orbit gear 15 and shaft 18 rearwardly, permitting relative rotation of shafts 16 and 18. Positive coupling meets conditions of wheel slippage on ice or snow or slippery terrain.

From the above description it will be apparent that the gear mechanism H can be readily used either for multi-axle or single axle drive.

It will be understood that any suitable speed may be selected by the mechanism H for power flow through gear group G. However, a change in speed via gear group G can be effected by shifting clutch 8 to the right, or left, in a well known manner so as to provide a dual speed selection directly for the distributor gear.

We claim:
1. A drive for a motor vehicle for optional two axle or single axle drive, comprising a multispeed gear shift mechanism and a distributor gear mechanism, a respective housing for each of said mechanisms, said housings having complemental openings, said housings being assembled to effect meshing gears between said mechanisms through said openings, whereby said distributor gear housing may be bodily removed from the housing of said multispeed gear shift mechanism.

2. In a drive as set forth in claim 1, said distributor gear mechanism having a gear extending beyond the opening of the respective housing so as to protrude into the housing of the multispeed gear shift mechanism when said housings are assembled for meshing with a gear of said multispeed gear shift mechanism.

3. A drive as set forth in claim 1, said distributor gear mechanism comprising a differential gear having a sun gear, planet carrier and planet gears, and an orbit gear; said sun gear being on a shaft adapted for driving one axle of a vehicle and said orbit gear being on a shaft for driving another axle; and a lockup means carried on said sun gear shaft connected for optionally effecting block rotation of said differential gear so that said axles are locked for simultaneous rotation.

4. A drive as set forth in claim 1, said multispeed gear shift mechanism comprising, a drive shaft, and a driven shaft for connection to a load for power transmission from said drive shaft through said multispeed gear shift transmission independently of said distributor gear mechanism.

5. A drive as set forth in claim 2, said distributor gear mechanism comprising a differential gear having a sun gear, planet carrier, and orbit gear; and shaft means whereby said sun gear and orbit gear are connected for drive of respective axles, said gear of said distributor gearing which protrudes above the housing thereof being connected to said planet carrier.

6. A drive as set forth in claim 1, one of said mechanisms having a connecting gear protruding beyond the opening of the respective housing to mesh with a gear in the other housing.

7. A drive as set forth in claim 6, said gear shift mechanism having a speed selective gear group with a countershaft and a gear thereon, said connecting gear being in mesh with said countershaft gear, said distributor gear mechanism comprising a planetary differential gear device having a planet carrier and said connecting gear being secured thereto for rotation thereof.

8. A drive as set forth in claim 3, wherein said sun, planet and orbit gears are spur gears.

9. A drive as set forth in claim 5, wherein said sun, planet and orbit gears are spur gears.

10. A drive as set forth in claim 7, wherein said differential gear device comprises sun, planet and orbit gears, all said gears being spur gears.

References Cited

UNITED STATES PATENTS

| | | | |
|---|---|---|---|
| 2,399,201 | 4/1946 | Buckendale et al. | 74—665 |
| 2,601,297 | 6/1952 | Keese | 74—665 X |
| 3,191,708 | 6/1965 | Simonds et al. | 74—665 X |

ARTHUR T. McKEON, Primary Examiner

U.S. Cl. X.R.

74—701